US012670191B2

(12) United States Patent
Shmuelov

(10) Patent No.: US 12,670,191 B2
(45) Date of Patent: Jun. 30, 2026

(54) KNOWLEDGE ATTRIBUTION AND ANSWER VALIDATION PLATFORM FOR GENERATIVE AI OUTPUT

(71) Applicant: Credible AI, Inc., Plainview, NY (US)

(72) Inventor: Akiva Shmuelov, Plainview, NY (US)

( * ) Notice: Subject to any disclaimer, the term of this patent is extended or adjusted under 35 U.S.C. 154(b) by 0 days.

(21) Appl. No.: 18/975,087

(22) Filed: Dec. 10, 2024

(65) Prior Publication Data

US 2026/0161676 A1 Jun. 11, 2026

(51) Int. Cl.
| | |
|---|---|
| *G06F 16/332* | (2025.01) |
| *G06F 16/35* | (2019.01) |
| *G06F 16/38* | (2019.01) |
| *G06N 5/04* | (2023.01) |

(52) U.S. Cl.
CPC .......... G06F 16/3328 (2019.01); G06F 16/35 (2019.01); G06F 16/382 (2019.01); G06N 5/04 (2013.01)

(58) Field of Classification Search
CPC .............................. G06F 16/3328; G06F 16/35
See application file for complete search history.

(56) References Cited

U.S. PATENT DOCUMENTS

| | | | |
|---|---|---|---|
| 7,555,476 | B2 | 6/2009 | Holbrook |
| 7,966,321 | B2 | 6/2011 | Wolosin et al. |
| 8,775,436 | B1 | 7/2014 | Zhou et al. |
| 2013/0124511 | A1 | 5/2013 | Levin et al. |
| 2014/0201614 | A1 | 7/2014 | Zhao |

| | | | | |
|---|---|---|---|---|
| 2019/0050639 | A1* | 2/2019 | Ast | ........................ G06V 10/82 |
| 2020/0334315 | A1 | 10/2020 | Du | |
| 2020/0349467 | A1 | 11/2020 | Teague | |
| 2021/0097095 | A1 | 4/2021 | Peavler et al. | |
| 2021/0374168 | A1 | 12/2021 | Srinivasan et al. | |
| 2024/0095575 | A1 | 3/2024 | Wei et al. | |

(Continued)

OTHER PUBLICATIONS

Written Opinion of the International Searching Authority for PCT/US2025/038418 established by the ISA/US completed on Sep. 29, 2025.

(Continued)

*Primary Examiner* — Courtney Harmon
(74) *Attorney, Agent, or Firm* — Goldstein Law Offices, P.C.

(57) ABSTRACT

A knowledge attribution and answer validation platform for generative AI output, comprising a knowledge database, a knowledge attribution engine, and an image repository. The knowledge database contains a plurality of knowledge elements produced via an ingestion process performed by the platform, each corresponding to a page of a source document. Each knowledge element has a knowledge validation image of its corresponding page which is stored within the image repository, and is linked to the image via attribution metadata. The knowledge attribution engine receives a user query, searches the knowledge database for knowledge elements relevant to the user query, and generates a response using knowledge derived from one of the source documents. The platform retains the attribution metadata for all knowledge elements used to generate the response, and retrieves and displays the corresponding knowledge validation images to provide both visual proof of answer and direct source attribution for the generated response.

13 Claims, 11 Drawing Sheets

(56) References Cited

U.S. PATENT DOCUMENTS

| | | | |
|---|---|---|---|
| 2024/0202221 A1 | 6/2024 | Siebel et al. | |
| 2024/0311422 A1* | 9/2024 | Lacko | G06F 16/532 |
| 2025/0192980 A1* | 6/2025 | Patil | G06F 16/254 |
| 2025/0245226 A1* | 7/2025 | Madhavan | G06F 16/2455 |
| 2025/0259013 A1* | 8/2025 | Reinert | G06F 40/284 |
| 2025/0292209 A1* | 9/2025 | Angilly | G06F 40/10 |

OTHER PUBLICATIONS

International Preliminary Report on Patentability of the International Searching Authority for PCT/US2025/038418 established by the ISA/US completed on Sep. 29, 2025.

* cited by examiner

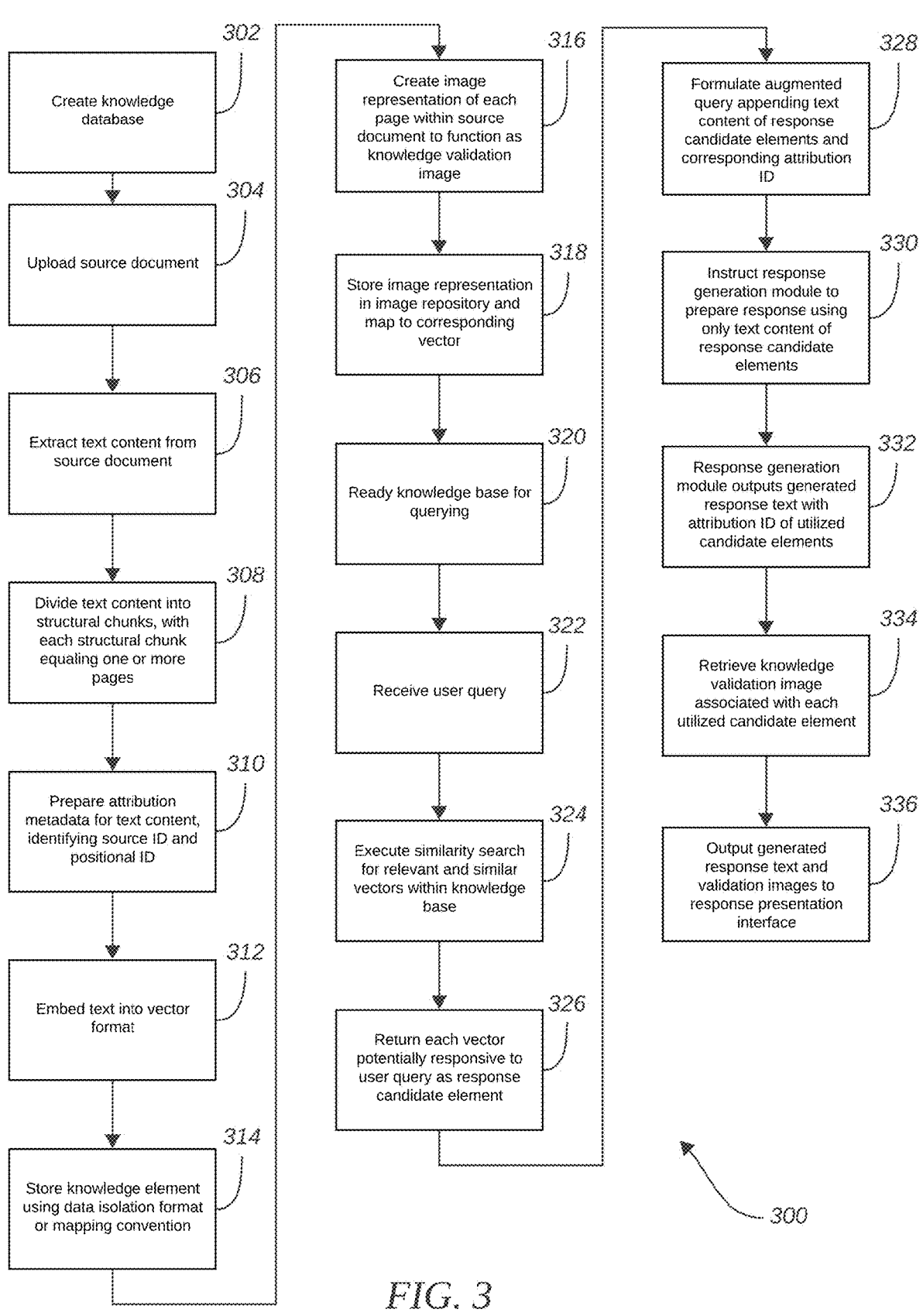

*FIG. 3*

302 Create knowledge database

304 Upload source document

306 Extract text content from source document

308 Divide text content into structural chunks, with each structural chunk equaling one or more pages

310 Prepare attribution metadata for text content, identifying source ID and positional ID

312 Embed text into vector format

314 Store knowledge element using data isolation format or mapping convention

316 Create image representation of each page within source document to function as knowledge validation image

318 Store image representation in image repository and map to corresponding vector

320 Ready knowledge base for querying

322 Receive user query

324 Execute similarity search for relevant and similar vectors within knowledge base

326 Return each vector potentially responsive to user query as response candidate element

328 Formulate augmented query appending text content of response candidate elements and corresponding attribution ID

330 Instruct response generation module to prepare response using only text content of response candidate elements

332 Response generation module outputs generated response text with attribution ID of utilized candidate elements

334 Retrieve knowledge validation image associated with each utilized candidate element

336 Output generated response text and validation images to response presentation interface

300

26VA

KNOWLEDGE ATTRIBUTION AND ANSWER VALIDATION PLATFORM FOR GENERATIVE AI OUTPUT

TECHNICAL FIELD

The present disclosure pertains to the field of artificial intelligence, specifically relating to systems and methods for enhancing the reliability and accuracy of responses generated by generative artificial intelligence models. The described solution integrates information retrieval and natural language processing technologies to provide precise source attribution and validation of responses produced by AI models. This involves techniques for database management, data segmentation, and information validation, aimed at reducing the occurrence of errors commonly referred to as hallucinations in AI-generated outputs. The disclosed system is pertinent to areas involving automated information systems, machine learning applications, and content generation platforms where accuracy and credibility of generated content are paramount.

BACKGROUND

In recent years, the integration of generative artificial intelligence (AI) into information retrieval systems has significantly advanced the ability to provide machine-generated answers to user queries. Generative AI models have become prevalent tools in various applications due to their apparent competence in interpreting natural language queries and generating user-tailored responses. These models utilize vast datasets to understand language patterns, enabling automated interaction with users seeking information. However, the reliability of these models remains a critical concern, as large language models and other such technologies may occasionally produce outputs that are factually incorrect or misleading. This phenomenon, known as hallucination, arises when the AI infers information that is not substantiated by its training data. Furthermore, even when the individual data elements used by the AI are accurate within their original and specific contexts, the generative responses may err by misconstruing the applicability of the information relative to the specific context of a query. For instance, a technical inquiry about the operation of a particular device may inadvertently result in a response derived from documentation related to a similar, yet technically distinct device, leading to discrepancies in crucial operational details. Moreover, generative AI models can generate responses that improperly combine pieces of solutions sourced from disparate, potentially conflicting references that are actually directed towards the substance of the user query, further exacerbating the issue of response reliability without reliable attribution or independent validation.

The underlying causes of such errors can often be attributed to the absence of reliable source attribution within the generative response process. The opaque 'black box' characteristic of these AI systems obscures the origin of the information utilized, rendering it difficult or impossible to verify the provenance of the knowledge presented. Even when such models are specifically instructed to append citations to their responses, these citations may not accurately correspond to the relevant sources, thus undermining their credibility.

In light of these challenges, there is an urgent need for a novel system which ensures that generated responses to user queries can be relied upon due to two key features. Firstly, all information incorporated into a generated response is provided with consistent and precise source attribution. Prior to generating an answer, user queries are augmented with factually correct knowledge drawn from a database which is partitioned by source document, thus preventing information from being drawn from multiple sources. Secondly, all knowledge used to generate the answer is consistently accompanied by attribution metadata which identifies both the originating source document and the original page. This allows the system to retrieve image representations of each page used to generate the answer using the attribution metadata, thus providing visual proof-of-answer which allows the user to validate the generated response by consulting the relevant page or pages of the source document. By incorporating accurate source attribution and providing visual proof through images of the source document, such a system would enhance the dependability of generative AI responses, thereby mitigating issues which have thus far hindered further acceptance of generative AI as a source of reliable and accurate information.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system which uses a generative artificial intelligence (AI) model to process a user query, generate an answer to the user query using relevant knowledge retrieved from a knowledge base, and eliminate uncertainty regarding the reliability of generative artificial intelligence (AI) answers by providing precise attribution to the source of the knowledge used by the generative AI. Accordingly, the present disclosure provides a knowledge attribution platform comprising a knowledge attribution engine and a knowledge database. The knowledge database contains knowledge elements drawn from a plurality of source documents. The knowledge attribution engine is adapted to receive a user query and then search the knowledge database for knowledge elements which are likely to provide an answer to the user query. The knowledge database is structured to allow each knowledge element to be accurately attributed to the originating source document at various stages of the platform's operation. This may be achieved by ingesting each source document to produce a plurality of knowledge elements. In a preferred embodiment, the contents of each page of a source document are embodied as a knowledge element. Furthermore, the knowledge database is configured such that all knowledge elements of each source document are isolated within a partition reserved solely for knowledge elements of the source document. Furthermore, each knowledge element can be attributed to the originating page or pages of the source document using attribution metadata. Once relevant knowledge elements identified by the search of the knowledge database, text content of the knowledge elements and the associated attribution metadata are passed to a generative artificial intelligence model with instructions to produce a generated response text containing an answer to the user query using the supplied text content. Furthermore, the instructions cause the generative artificial intelligence model to maintain attribution to the originating source document and document chunk using the attribution metadata, allowing the knowledge contained within the generated response text to be traced to both the source document and the corresponding page or pages, thus allowing the accuracy of the answer to be validated.

It is another aspect of an example embodiment in the present disclosure to provide a system which provides proof of answer alongside the generated response text. Accordingly, in one embodiment, the knowledge attribution engine comprises an image repository which contains an image representation of each page of the source document from which each knowledge element is derived. Crucially, a knowledge validation image for each page is created along with the corresponding knowledge element as a result of the ingestion process, along with the attribution metadata. The knowledge attribution engine utilizes the attribution metadata carried through the steps of the engine's operation to identify the source document and the page or pages utilized to produce the generated response text, and retrieve the corresponding knowledge validation image.

It is yet another aspect of an example embodiment in the present disclosure to provide a system which allows knowledge content of the knowledge elements to be stored in a manner which facilitates similarity searches, while also allowing original text content to be preserved. Accordingly, each knowledge element has an encoded text portion derived from the text content of the originating document chunk. The encoded text portion may be a vector containing text embeddings, enabling the encoded text to capture semantic and contextual understanding necessary to facilitate efficient search operations and also to enhance the functionality of generative artificial intelligence models in the knowledge attribution process. The knowledge database may further store the text content of the knowledge element, or allow such text content to be referenced using the attribution metadata.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

FIG. 3 is a flowchart depicting an example knowledge attribution operational process, in accordance with an embodiment in the present disclosure.

Figure 1:
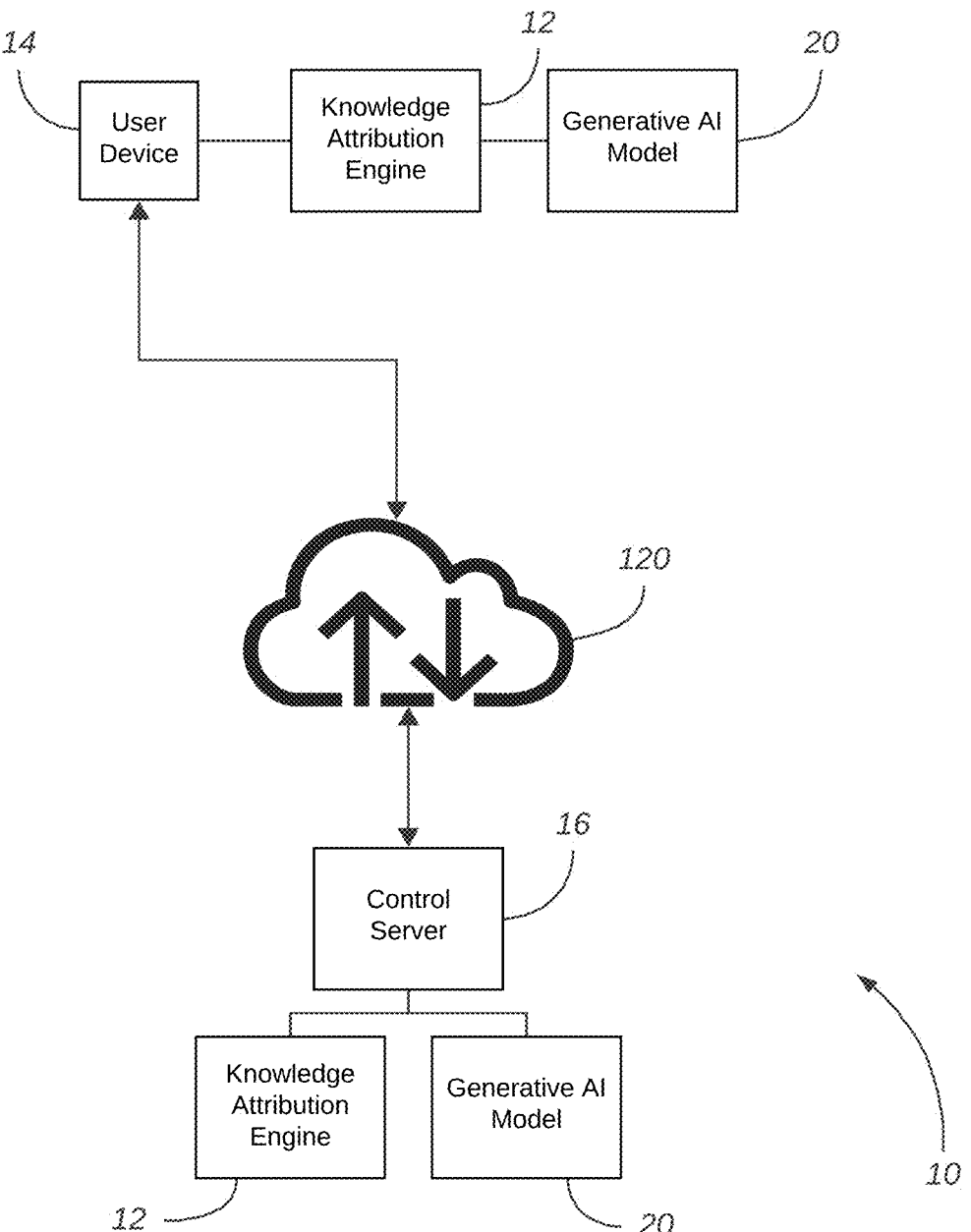
FIG. 1 is a block diagram depicting a knowledge attribution platform in which a knowledge attribution engine can be configured to execute on a user device or via a control server accessible over a data communication network, in accordance with an embodiment in the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

FIGS. 1-4 illustrate a knowledge attribution platform 10 configured to enhance the reliability and accuracy of generative artificial intelligence model outputs in response to user queries 14Q. The platform 10 is configured to address inaccuracies or ambiguities in generative AI outputs by ensuring that all outputs can be directly attributed to verifiable source documents 32 within a knowledge database 24. Each response generated by the platform is accompanied by attribution metadata 36, which specifies the exact source document 32 and page from which the information is drawn. Additionally, a knowledge validation image 26V is retrieved for each referenced page from an image repository 26, thereby providing visual proof of the answer's authenticity. This approach facilitates the production of responses that are both factually correct and reliably traceable back to their original source.

Figure 2:
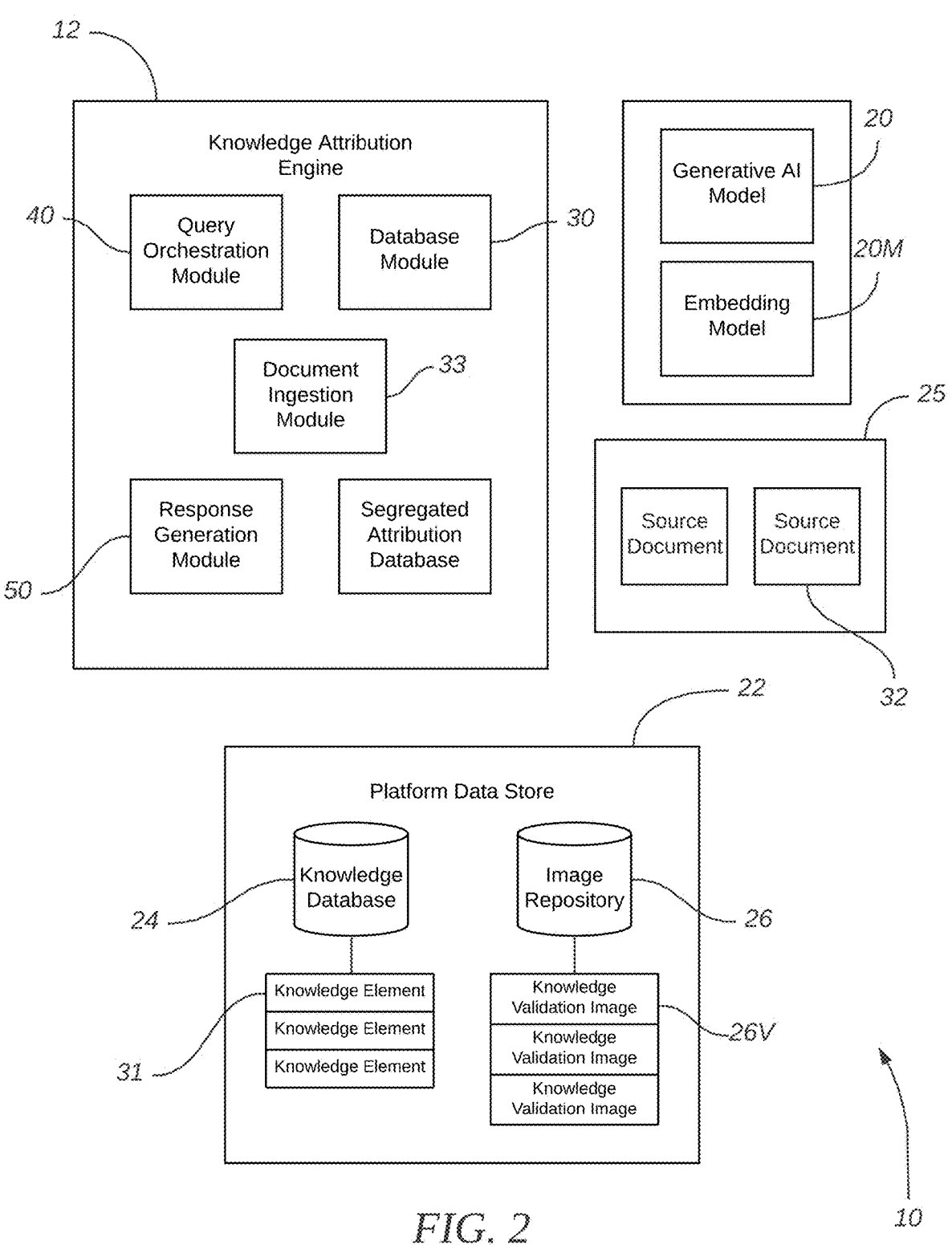
FIG. 2 is a block diagram depicting an example architecture of the knowledge attribution engine, showing a plurality of platform modules, a generative artificial intelligence model configured for query resolution, data processing, and response generation functions, and a platform data store with a knowledge database and image repository, in accordance with an embodiment in the present disclosure.
Figure 4:
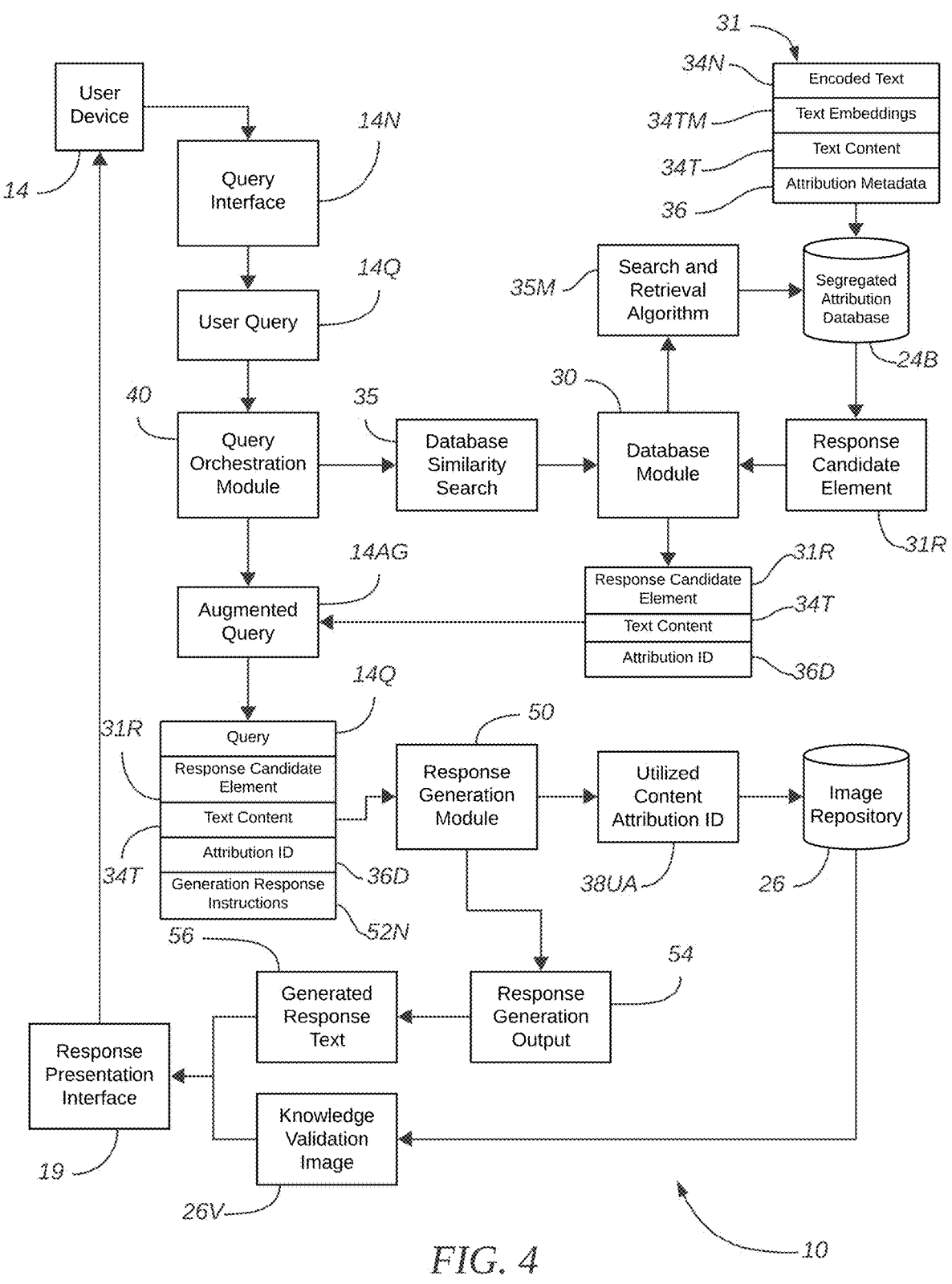
FIG. 4 is a block diagram depicting an example query resolution process, in accordance with an embodiment in the present disclosure.

Referring to FIG. 1 and FIG. 2, the knowledge attribution platform 10 comprises a knowledge attribution engine 12. In certain embodiments, the platform may be deployed as a network-based solution further comprising a control server 16 operably connected to a data communication network 120 such as the internet. A user device 14 can be used to access the functions of the platform by connecting to the control server 16 via the data communication network 120. The functions of the platform are carried out by a knowledge attribution engine 12, which can be implemented via the control server 16, as a locally executed variant using the user device 14, or as a combination in which functions are shared between the user device 14 and the control server 16. The user device 14 may be a personal computer, mobile device, tablet, or other computing device. In certain embodiments, the control server 16 can be implemented utilizing server or enterprise-grade hardware architecture, which is optimized to accommodate a high volume of user interactions or an extensive processing load involving substantial requests concurrently.

In a preferred embodiment, certain platform functions are implemented using generative artificial intelligence (AI) models 20. In an embodiment, the generative AI models 20 can be implemented either locally on the user device 14 or remotely via the control server 16, based on a consideration of various parameters such as computational resource requirements, security or privacy concerns, and operational efficiencies. Implementing generative AI models 20 locally on the user device 14 may be advantageous in situations where immediate access to device-specific context or data is essential, or where user data privacy mandates local processing to prevent transmission over networks. Conversely, deploying generative AI models 20 on the control server 16 may be preferable when the models necessitate substantial computational power that exceeds the capabilities of the user device 14.

Referring to FIG. 2, FIG. 3, FIG. 4, and FIG. 5, in an embodiment, the knowledge attribution engine 12 has a plurality of engine modules, comprising a query orchestration module 40, a document ingestion module 33, a database module 30, and a response generation module 50. The knowledge attribution engine 12 further comprises a platform data store 22, the platform data store 22 having a knowledge database 24 containing a plurality of knowledge elements 31, and an image repository 26 containing a plurality of knowledge validation images 26V. The knowledge elements 31 within the knowledge database 24 represent pieces of data or information, each drawn from a source document 32. Furthermore, each knowledge element 31 contains attribution metadata 36 which links the content within the knowledge element 31 to the original source document 32. In one embodiment, the attribution metadata identifies the source document 32 and may also reference the page number from which the content was derived. In a preferred embodiment, the attribution metadata 36 facilitates efficient retrieval of the knowledge validation image 26V of the originating page, such as by providing a location address to where the knowledge validation image 26V is located. The knowledge elements 31 collectively form a knowledge base which is utilized by the knowledge attribution engine 12 to respond to user queries 14Q. A user query 14Q may correspond to a phrase or sentence containing a request for information, a question, or an instruction to perform a specific task. Examples of user queries 14Q may include informational inquiries seeking detailed facts, troubleshooting queries for resolving specific issues, decision-support requests requiring analysis of data, or exploratory questions aimed at understanding complex subject matters, among other types, which are directed to the source documents 32 in the knowledge database 24. Examples of source documents 32 may include research documents, FAQ's, legal documents, informational articles, product or service descriptions, financial documents, 10-K's, 10-Q's, annual reports, contracts, product manuals, policy documents, emergency response guides, regulatory and compliance documents, operational procedures, training and onboarding guides, as well as books, papers, and publications. The quality and accuracy of responses produced by the generative aspects of the knowledge attribution platform 10 depend significantly on the quality of the source documents 32. As such, the knowledge base is preferably comprised of source documents 32 known to contain verified or factually correct information. By utilizing reliable and validated content, the platform ensures the generated response is grounded in credible data, thus enhancing the probability of producing outputs that accurately reflect the information contained within the original source documents 32.

The engine modules each perform a set of platform functions which execute steps within a knowledge attribution operation process 300. A brief overview of the functionality of each of the engine modules is now provided, with a more detailed discussion to follow. In an embodiment, the database module 30 is adapted to maintain the knowledge database 24 and facilitate searches of the knowledge elements 31 contained therein. The database module 30 is adapted to facilitate a database similarity search 35, and employ a search and retrieval algorithm 35M to identify and return search results in the form of response candidate elements 31R. The document ingestion module 33 is adapted to prepare new source documents 32 for ingestion into the knowledge database 24 in accordance with the database organization and database structure design principles of the knowledge attribution platform 10, in order to ensure proper source attribution of newly ingested knowledge elements 31. In a preferred embodiment, the document ingestion module 33 executes crucial function by transforming each page of a source document 32 into a corresponding knowledge element 31. This ingestion process involves generating an encoded text portion 34N, attribution metadata 36, and a knowledge validation image 26V for each page of the source document 32. The encoded text portion 34N is derived from the textual content of the page, capturing its semantic and contextual essence in numerical vector form. The attribution metadata 36 is carried forth in the knowledge attribution process and serves as a vital linkage, associating the content of the knowledge element 31 with the originating page and source document 32, via the corresponding knowledge validation image 26V. A more detailed exploration into the ingestion processes of the knowledge attribution engine 12 will be provided later within the present disclosure.

In an embodiment, the query orchestration module 40 is adapted to receive and process a user query 14Q, and initiate a database similarity search 35 via the database module 30. In a preferred embodiment, the query orchestration module

40 allows the user to direct the user query 14Q to a specific source document 32. The source document 32 may be referenced by name (or other unique identifier) within the text of the query itself. Alternatively, the query interface 14Q may allow the user to identify or select the source document 32 from a list of source documents 32 embodied within the knowledge database 24. The query orchestration module 40 may then automatically append instructions which direct the query towards the selected source document 32. The query orchestration module 40 is further adapted to produce and transmit an augmented query 14AG to the response generation module 50. The augmented query 14AG combines the user query 14Q with the content of the knowledge elements 31 returned by the database similarity search 35. Such elements can be referred to as response candidate elements 31R, and retain the source attribution information of the corresponding knowledge element 31. The augmented query 14AG constitutes an instruction to the response generation module 50 to produce an answer to the user query 14Q using the supplied response candidate elements 31R, while maintaining source attribution using supplied attribution identifiers 36D.

The response generation module 50 may comprise a generative AI model 20 configured with generative and natural language processing functionality, allowing the module to interpret natural language requests, questions, and instructions. Once the response generation module 50 receives the augmented query 14AG, the generative AI model 20 of the response generation module 50 produces a generated response text 56 containing an answer to the user query 14Q. The generative AI model 20 produces the answer using only the response candidate elements 31R within the augmented query 14AG, modified by any generation response instructions 52N where applicable. The response generation module 50 is further adapted to identify the attribution metadata of the knowledge elements 31 which are reflected within the generated response text 56. These identifiers are referred to as utilized content attribution identifiers 38UA, and are included within the response generation output 54. In one embodiment, the utilized content attribution identifiers 38UA may be included separately from the actual generated response text 56, such as within a metadata field. Likewise, the attribution metadata of any response candidate elements 31R which are not utilized by the generative AI model 20 are omitted from the response generation output 54. Furthermore, referring to FIG. 9 as well as FIG. 2, the knowledge attribution engine 12 utilizes the utilized content attribution identifiers 38UA to retrieve the knowledge validation image 26V linked to the source attribution identifier 38A and the source position identifier 38B. The knowledge validation images 26V are then presented to the user to provide proof-of-answer, by verifying that the information within the generated response text 56 aligns with the content within the pages of the originating source document 32.

Turning now to FIG. 3 while also referring to FIG. 2, FIG. 4, FIG. 5, FIG. 6 and FIG. 7, we now examine the example knowledge attribution operational process 300 in more detail. The process begins at step 302 with the creation of the knowledge database 24. In one embodiment, the knowledge attribution platform 10 has an ingestion interface 18 which allows a user to upload a source document 32 for incorporation into the knowledge database 24. Uploading or otherwise importing a source document 32 occurs at step 304. In an embodiment, the ingestion interface 18 is configured to enable the knowledge attribution platform 10 to receive source documents 32 through various upload or import methods. The ingestion interface 18 is configured to support the upload or import of source documents 32 either singly or in batches.

In a preferred embodiment, once a source document 32 has been uploaded or imported, the document ingestion module 33 begins a process by which the source document 32 is converted into a plurality of knowledge elements 31. At step 306, the document ingestion module 33 extracts the text of each source document 32. The extracted source text content 34T refers to all text extracted at the level of the entire source document 32. These source documents 32 may be provided in multiple formats, including but not limited to text documents, PDFs, and images. In certain embodiments, multimedia files may be imported as source documents 32. Where necessary, the ingestion interface 18 supports processing techniques such as Optical Character Recognition (OCR) for text extraction from images, and speech-to-text conversion for transforming spoken language from audio or video files into text format suitable for processing.

Next, at step 308, the document ingestion module 33 utilizes a document ingestion algorithm 30N to divide the extracted source text content 34T into one or more document chunks 34. Each document chunk 34 may represent a structural or organizational component of the original source document 32, such as a page, chapter, section or other such element of organization, and the document ingestion algorithm 30N ensures that the extracted text content 34T remains correctly aligned with the original source document 32 following ingestion. In a preferred embodiment, the document ingestion module 33 creates one knowledge element 31 for each document chunk 34, and the relevant steps are repeated until every document chunk 34 has been processed. In alternative embodiments, the process of document ingestion may be varied by altering the sequence in which chunking and text extraction are performed, while still maintaining accurate alignment between the resulting knowledge elements 31 and the original pages of the source document 32. For instance, instead of initially extracting the text content from the entire source document 32, an embodiment may instead commence with dividing the source document 32 into document chunks 34 that correspond to individual segments or pages. For example, the original document file may be divided into individual pages upon ingestion. Subsequently, text content can be extracted from each respective document chunk 34. Such modifications to the ingestion process are anticipated to address varying formats of source documents 32 as required. However, despite these potential variations, the document ingestion algorithm 30N strictly ensures that the extracted text content 34T accurately aligns with the text located on the actual pages of the original source document 32 prior to ingestion. Thus, regardless of whether text extraction precedes or follows the division into document chunks, consistency and accuracy of content representation relative to the original document format are preserved throughout the document ingestion process.

Returning to the illustrated example process, at step 310, the document ingestion module 33 defines attribution metadata 36 for the source document 32 and the document chunks 34. The source attribution identifier 38A identifies the source document 32 itself, while the source position identifier 38B allows knowledge within the text content 34T to be traced to a specific part of the original source document 32 for attribution and ease of reference, such as the original page.

Next, at step 312, the document ingestion module 33 will encode the text content 34T of each document chunk 34 into a format suitable for subsequent processing. The encoding process can be carried out using an embedding model 20M, which functions by mapping text input data into a continuous vector space. The resulting vector representation may be referred to as an encoded text portion 34N.

Converting the text of the document chunk 34 into the encoded text portion 34N involves translating the text content 34T into numerical representations, known as embeddings, which capture the underlying semantic relationships and contextual nuances inherent in the original text. This process facilitates a more refined analysis of the text by the database similarity search function 35, enabling the search and retrieval algorithm 35M to discern meaning beyond the mere lexical arrangement of words, thus supporting more accurate information retrieval and response generation. Through contextual embeddings, vectors allow the search and retrieval algorithm 35M to recognize patterns and relationships among concepts, which promotes efficient similarity searches within the knowledge database 24 and facilitates the identification and retrieval of relevant knowledge elements 31 during query processing.

Next, at step 314, the encoded text portion 34N is stored within the knowledge database 24 as a knowledge element 31. The encoded text portion 34N, the source attribution identifier 38A, and the source position identifier 38B collectively constitute the knowledge element 31. In one embodiment, the knowledge database 24 is organized to facilitate precise source attribution of each individual knowledge element 31 through segregation of data, thus constituting a segregated attribution database 24B. To achieve this, the knowledge database 24 employs an index that is divided into a plurality of logical partitions 28. Each partition 28 is uniquely associated with a specific source document 32, creating a distinct namespace or isolation area dedicated to that document. The partitioning strategy ensures that all knowledge elements 31 originating from a particular source document 32 are stored within the corresponding partition 28.

This organizational structure supports efficient retrieval and validation processes by maintaining consistent alignment between the knowledge elements 31 and their respective source documents 32 through two mechanisms. Firstly, targeted searches for information from a target source document 32 can be directed to the corresponding partition 28, thus ensuring that all knowledge elements 31 returned by the search will be associated with the desired source document 32. Secondly, in subsequent stages of the knowledge attribution process, the attribution metadata of each knowledge element 31 preserves the link between the encoded text portion 34N and the originating source document 32.

The source attribution identifier 38A and the source position identifier 38B can be stored directly within the knowledge element's entry within the knowledge database 24. In certain embodiments, the attribution metadata 36 comprises both the source attribution identifier 38A and the source position identifier 38B. The attribution metadata 36 may be embedded directly within the knowledge element 31, alongside the encoded text portion 34N. Alternatively, the attribution metadata 36 can be stored in a separate metadata table 24M distinct from the text content. This metadata table 24M may operate as an indexed repository which cross-references each knowledge element 31 with its respective source document 32 and document chunk 34 through the source attribution identifier 38A and the source position identifier 38B.

In an alternate embodiment, the knowledge database 24 may be implemented without the use of partitions 28 which separate the knowledge elements 31 of each source document 32. Instead, this alternate embodiment employs a mapping strategy where each source document 32 is identified and referred to using the document's file name or another identifier, such as a unique alphanumeric code or designated label. During the document ingestion process, as discussed earlier, the text content 34T extracted from each document chunk 34 is processed for encoding. In this embodiment, the encoded text portions 34N assigned to each document chunk 34 are given a vector name corresponding to the source document's file name or another identifier which uniquely identifies the source document 32. The vector name identifies the knowledge element 31 and implicitly links it to the source document 32 and the specific document chunk 34. In a preferred embodiment, this file name or identifier is reflected within the attribution metadata 36, as the source attribution identifier 38A.

This naming convention facilitates the indexing of knowledge elements 31 within the knowledge database 24 by mapping each vector name to a corresponding file name or unique identifier. Consequently, the knowledge database 24 is structured to enable searches and retrievals of encoded text portions 34N by limiting the similarity search results 35R to searches using only the vector name associated with the source document 32. This approach ensures that knowledge elements 31 can be precisely attributed to their originating source documents 32 through the file name and the corresponding attribution metadata 36, without requiring partitioning of the knowledge database 24.

In addition to populating the knowledge database 24, the document ingestion process also involves the preparation of a knowledge validation image 26V for each knowledge element 31 and the originating portion of the source document 32. The knowledge validation image 26V facilitates proof of answer and represents an accurate depiction of the portion of the original source document 32.

Figure 9:
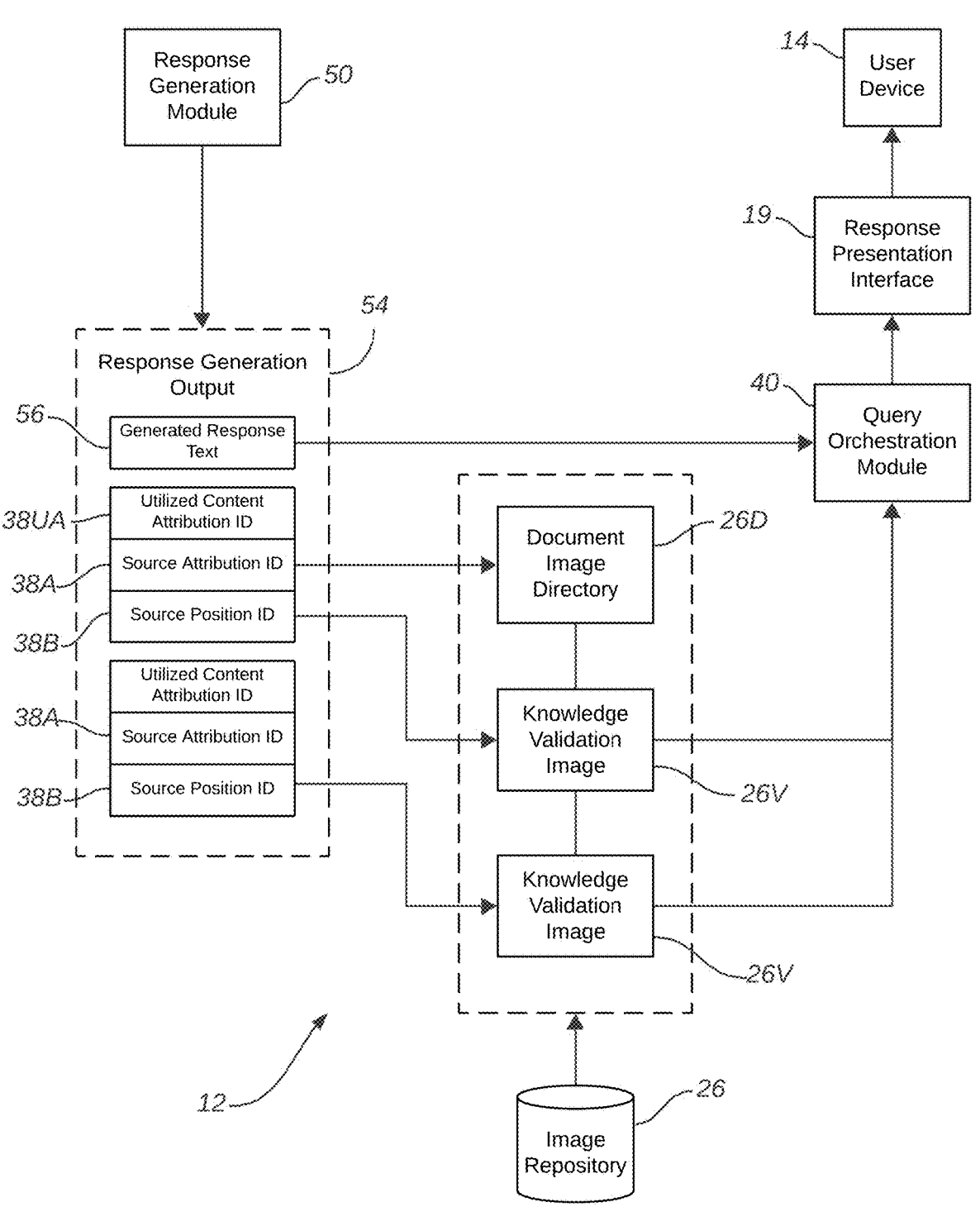
FIG. 9 is a block diagram depicting a knowledge validation process in which the response presentation interface displays a knowledge validation image for each knowledge element utilized by the response generation module to produce the generated response text, in accordance with an embodiment in the present disclosure.
Figure 10:
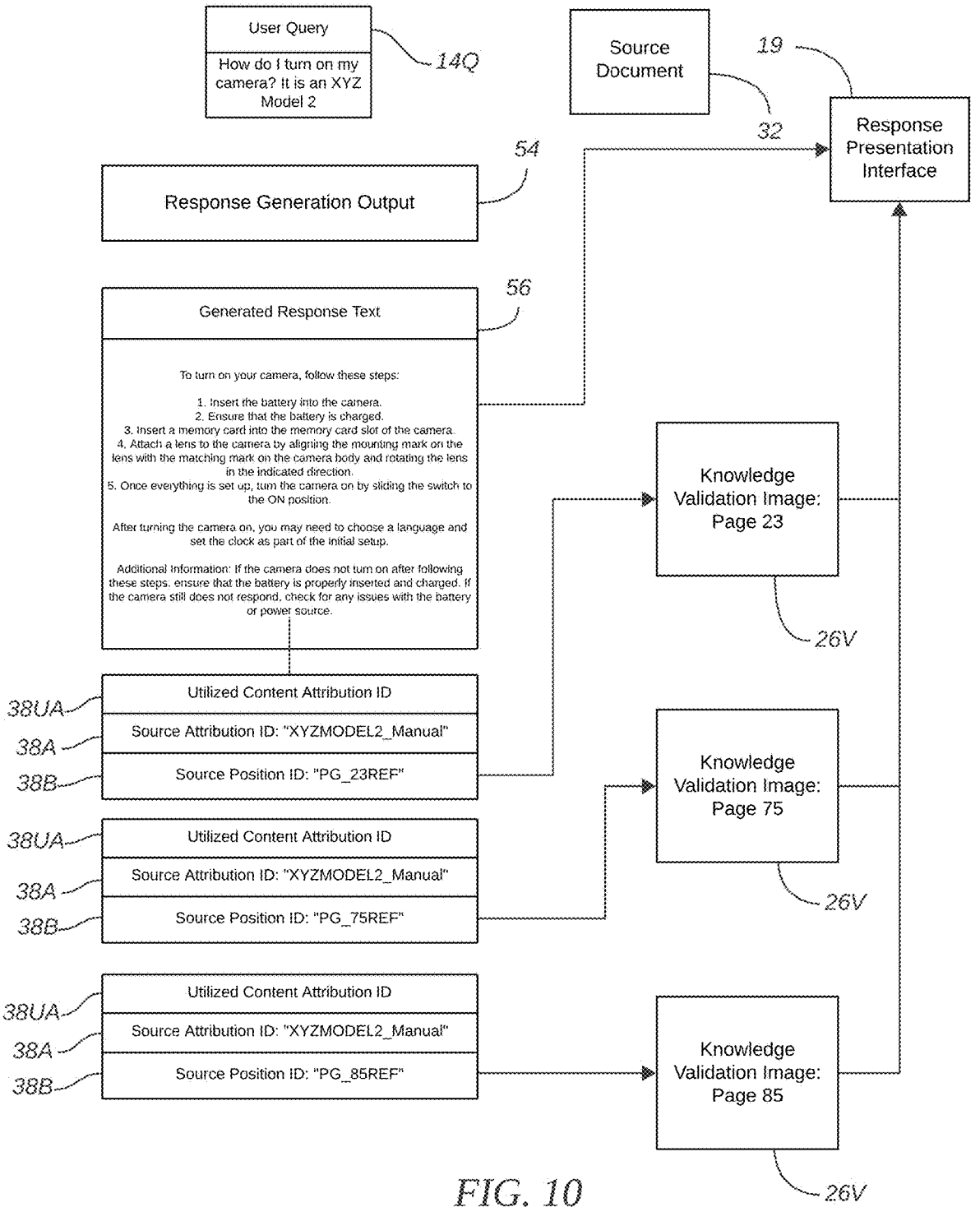
FIG. 10 is a block diagram depicting an example response generation output and a set of knowledge validation images generated in response to an example user query, in accordance with an embodiment in the present disclosure.
Figure 11:
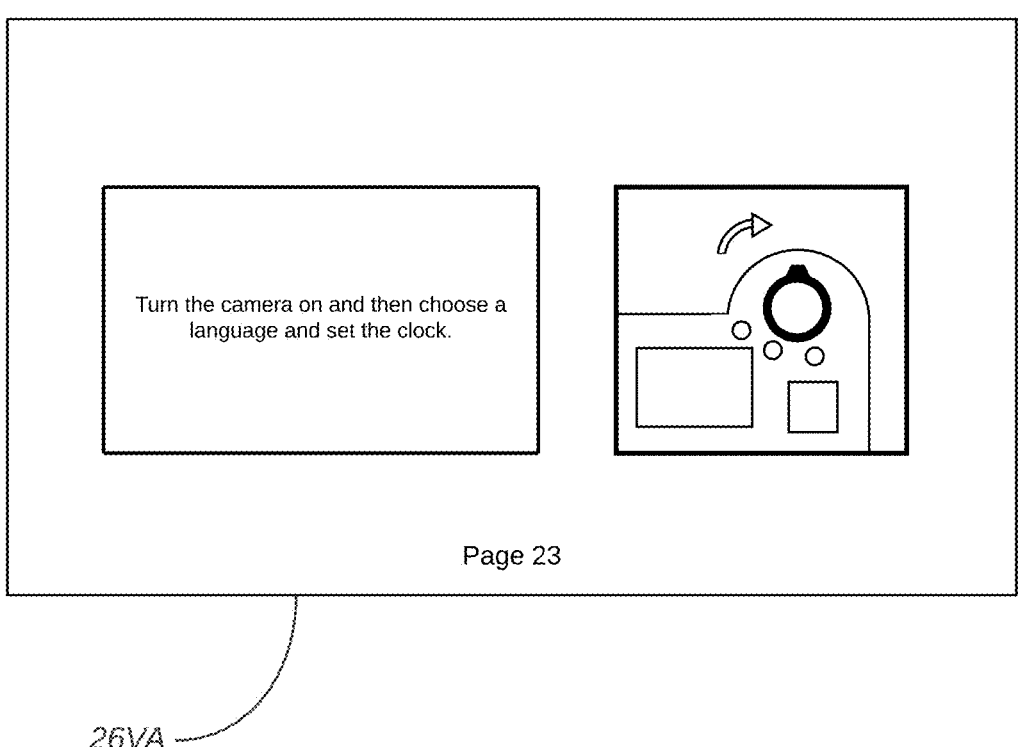
FIG. 11 is a diagram depicting a portion of an example knowledge validation image, showing an example illustration drawn from the originating page of the source document, in accordance with an embodiment in the present disclosure.

In one embodiment, at step 316, the knowledge validation images 26V are generated by capturing static visual representations, such as screenshots or image captures, of relevant portions of the source document 32 from which the document chunks 34 are derived. In a preferred embodiment, each such portion corresponds to one page of the source document 32. In an embodiment, the knowledge validation image 26V may accurately capture not only the text content of the source document 32, but also the appearance of each page, including fonts, images, tables, and colors. Furthermore, user edits, highlights, comments, sticky notes, watermarks, signatures, and markups such as lines, shapes, or freehand annotations, may also be captured and shown within the knowledge validation image 26V. Each source document 32 may be allocated an exclusive storage directory within the document image repository 26, and the corresponding knowledge validation image 26V for each page may be stored within this directory at step 318. In one embodiment, this directory may be referred to as a document image directory 26D (as shown in FIG. 9). The allocation of a dedicated directory facilitates efficient retrieval and organization of the images, ensuring they remain directly linked to the respective pages from which they are sourced. Furthermore, maintaining a pre-generated repository of images within the platform data store 22 which can be accessed immediately, facilitates quick and efficient validation of information embodied within outputs generated by the knowledge attribution engine 12.

The knowledge attribution engine 12 may employ the attribution metadata 36 to establish a mapping between the extracted information from a specific knowledge element 31 contained with platform generated output, and its corresponding knowledge validation image 26V. The metadata allows identification of the originating source document 32 and document chunk 34, enabling the engine to accurately locate the knowledge validation image 26V that visually substantiates the information within the output. In one embodiment, the source position identifier 38A of the attribution metadata 36 corresponds to a location address which identifies the storage location of the knowledge validation image 26V.

This process supports the objective of providing a clear and verifiable source attribution, thereby enhancing the confidence in and reliability of generated outputs within the knowledge attribution engine 12. Knowledge validation images 26V can be presented to users for viewing. Alternatively, validation can be automated, and such images can be provided to a generative model adapted to compare the information within the generated output against the information of the original source document 32 and the originating page.

In certain embodiments, the knowledge attribution engine 12 may utilize text-based knowledge validation citations in lieu of, or in combination with images. A text-based knowledge validation citation may include a segment of text extracted from the original source document 32 which is presented with generated response text, using the attribution metadata 36 as a reference. For example, the citation may correspond to the text content associated with the particular page identified by the source position identifier 38B.

At step 320, once the source document 32 is fully ingested, the knowledge database is ready for use, and the knowledge attribution platform 10 may now accept queries directed to the source document 32.

We now proceed to step 322 and examine how a user query 14Q is received and processed.

Referring to FIG. 2, FIG. 3, FIG. 4, and FIG. 7, the user query 14Q may be inputted into the knowledge attribution platform 10 through a query interface 14N, which is configured to facilitate user interactions with the knowledge attribution engine 12. The query interface 14N can be implemented as a software application on a user device 14, allowing access to the knowledge attribution engine 12 and its user-facing features. Alternatively, query integration may be achieved via a knowledge attribution engine application programming interface (API), enabling other applications to submit queries to the knowledge attribution platform 10 for processing.

The user query 14Q may be a general question seeking information presented in natural language format or may contain specific instructions for task execution. Examples include informational inquiries, requests for detailed facts, instructions for troubleshooting, or exploratory questions related to complex subject matters. As previously noted, user queries 14Q show a broad range of potential forms, and may also be directed to specific source documents 32 within the knowledge database 24.

The query interface 19 may provide users with the capability to designate one or more specific source documents 32 to be searched for information pertinent to the user query 14Q. This functionality is useful for targeting the database similarity search 35, as it narrows the scope of the search to the specified documents, enhancing search efficiency and relevance of the results. For example, a user requesting information regarding in-flight troubleshooting procedures for a specific aircraft can specify that the search be targeted to the pertinent manual which has been previously ingested into the knowledge database 24.

Upon receipt of the user query 14Q, the query orchestration module 40 processes the query at step 324. The query orchestration module 40 is configured to initiate a database similarity search 35 via the database module 30. This search employs a search and retrieval algorithm 35M, tailored to identify knowledge elements 31 most relevant to formulating a response to the user query 14Q, all while respecting any document-specific instructions provided within the query.

In one embodiment, the search and retrieval algorithm 35M identifies relevant knowledge elements 31, utilizing the encoded text portions 34N which are stored as vector embeddings within the knowledge database 24. The database similarity search 35 may employ embedding-based search strategies that utilize principles of semantic, similarity, and context-based retrieval. These strategies rely on the vector space model, wherein text content 34T from the source document 32 is embedded into a multi-dimensional space. The positions of these vectors encapsulate semantic meanings and contextual relationships, allowing for queries to be matched with knowledge elements 31 based on the proximity of their corresponding embeddings.

Semantic search utilizes text embeddings 34TM to capture nuanced meaning, allowing the identification of vectors with similar semantic content despite lexical differences. This improves response alignment with user intent over strict word matching. Synonyms or related terms result in embedding vectors closely positioned within the vector space, enabling retrieval of relevant information despite terminological variations. Similarity search further enhances this by identifying vectors proximate to the query, using measures such as cosine similarity or Euclidean distance to assess similarity. This process enhances the relevance of response candidate elements 31R during retrieval. Context search enhances comprehension of conceptual interplay by using embeddings to maintain contextual clues from the source document 32. This allows the system to identify document portions most aligned with the user's information request, including implied meanings and idiomatic expressions, enabling retrieval of information that adheres to the context of the user query 14Q.

In one embodiment, when a user query 14Q is directed to a single source document 32, the database similarity search 35 retrieves knowledge elements 31 from only one designated partition 28 or a mapped set of knowledge elements 31, corresponding distinctly to the target source document 32. This focused retrieval process ensures that the knowledge elements 31 pertinent to the user query 14Q originate exclusively from a single location, thereby maintaining internal consistency and coherence in response generation.

In circumstances where the user query 14Q requires a search across multiple source documents 32, the search and retrieval algorithm 35M employs sophisticated ranking or scoring methodologies. These methodologies evaluate the relevance of identified knowledge elements 31 against the query context using predefined criteria such as the embedded semantic similarity or contextual pertinence. The algorithm then ranks the potential sources by their score to determine the source document 32 that offers the most reliable and consistent information for generating a response.

By limiting the search results to a single source document's knowledge elements 31 when optimal results are identified, the algorithm maintains the integrity of the AI-generated answer. This approach mitigates the risk of introducing contradictory or divergent data, which can arise from attempting to synthesize information from disparate documents with potentially conflicting perspectives. Instead, the response reflects consistency in alignment with data drawn from a singular, verified source document 32, ensuring the generated response text 56 aligns with the source's foundational data principles and factual basis.

At the conclusion of the search, the database module 30 returns the most optimal knowledge elements 31 as search results 35R at step 326. Each such knowledge element 31 can be referred to as response candidate element 31R. Each response candidate element 31R retains the source attribution identifier 38A and source position identifier 38B which links the knowledge to the original source document 32. In a preferred embodiment, the source position identifier 38B references the original page of the source document 32 from which the knowledge is derived.

Figure 8:
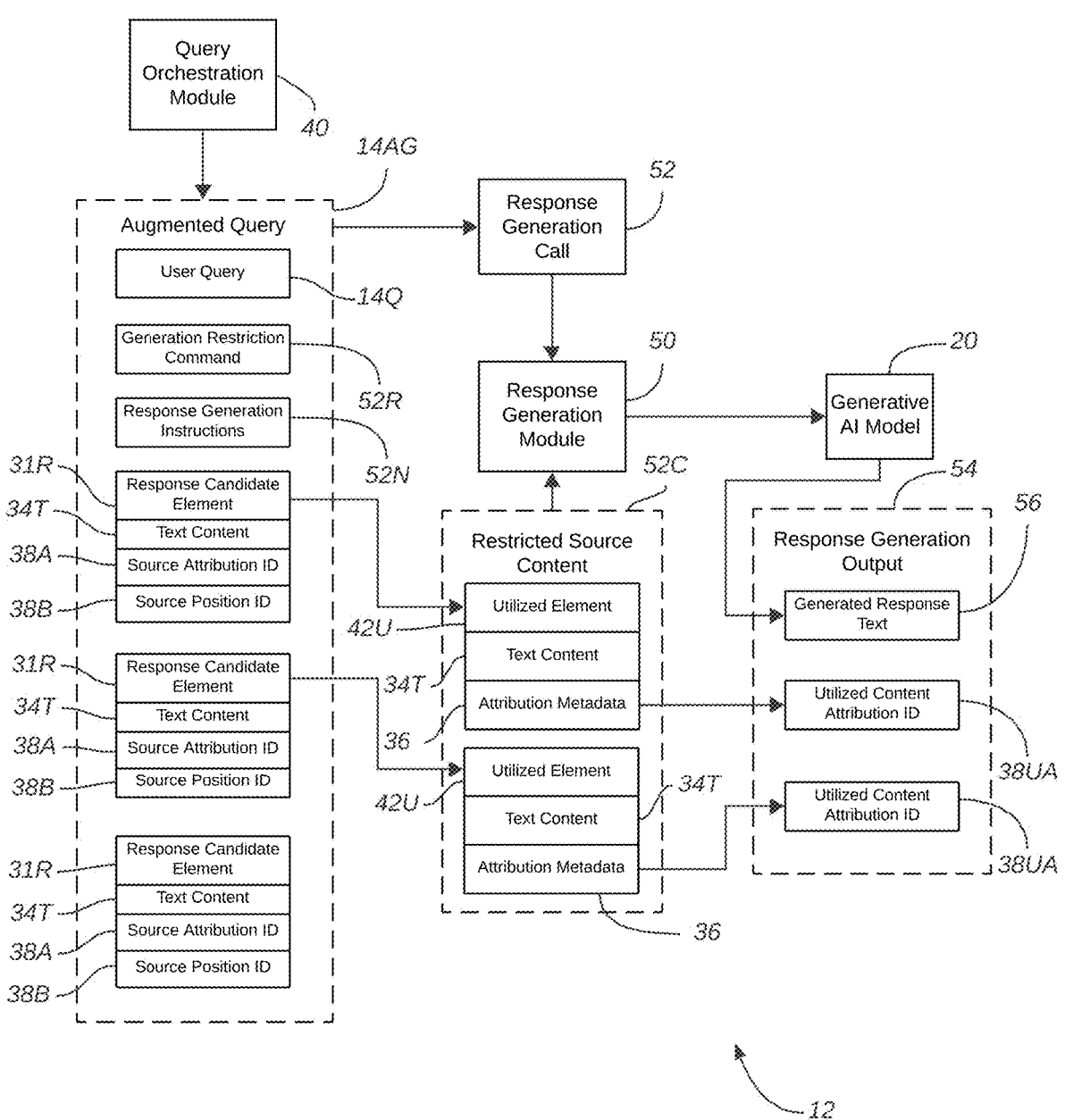
FIG. 8 is a block diagram depicting an example response generation process in which the query orchestration module combines the response candidate elements with the original user query to produce an augmented query, and instructs the response generation module to produce a response generation output with a generated response text and a utilized content attribution identifier, in accordance with an embodiment in the present disclosure.

At step 328, the query orchestration module 40 receives the search results 35R, and produces an augmented query 14AG. Turning now to FIG. 8 while also referring to FIG. 2, FIG. 3, FIG. 4, and FIG. 7, the augmented query is sent to response generation module 50 as a response generation call 52 at step 330. The augmented query 14AG comprises an integration of the substantive content from the original user query 14Q, the response candidate elements 31R, and the associated text content 34T. The augmented query 14AG preserves the source attribution by incorporating the source attribution identifier 38A and the source position identifier 38B for each piece of text content 34T included. In a preferred embodiment, response generation instructions 52N are incorporated into the augmented query 14AG. These instructions may include a command for the response generation module 50 to track or record the specific response candidate elements 31R which are utilized to produce the generated response text 56. This ensures that the generative AI model of the response generation module 50 can maintain a clear linkage of the generated response back to specific portions of the original source documents 32.

To ensure accuracy and relevance, the augmented query 14AG includes a generation restriction command, instructing the response generation module 50 to limit its output strictly to restricted source content 52C contained within the augmented query 14AG itself. This mechanism operates as a constraint within the generative framework of the generative AI model 20 employed by the response generation module 50, directing it to draw solely on pre-validated information contained within the response candidate elements 31R, thereby mitigating the risk that the generated response text 56 will deviate from factual source-based data.

Upon receiving the response generation call 52, the response generation module 50 initiates the process for generating the response generation output 56 in accordance with the response generation instructions 52N. In a preferred embodiment, the generative AI model 20 of the response generation module 50 receives each of the response candidate elements 31R which form the restricted source content 52C, and proceeds to formulate an answer to the user query 14Q using only the information contained within the restricted source content 52C.

Where multiple response candidate elements 31R are included in the response generation call 52, the response generation module 50 will produce the generated response text 56 using at least one of these response candidate elements 31R, while certain response candidate elements 31R may fail to be utilized by the generative AI model 20. The response candidate elements 31R which are reflected in the generated response text 56 are referred to as utilized elements 42U.

At step 332, the response generation module 50 then formulates a generated response text 56 which constitutes a natural language answer designed to accurately address the user query 14Q. The generative AI model 20 employed by the response generation module 50 ensures that the generated response text 56 reflects the underlying information encapsulated in the utilized elements 42U and adheres to the constraints of the generation restriction command 52R, by anchoring the output exclusively in the restricted source content 52C.

In conjunction with the generated response text 56, the response generation module 50 is instructed to incorporate utilized content attribution identifiers 38UA into the response generation output 54. These identifiers may comprise the source attribution identifier 38A and source position identifier 38B for each utilized element 42U. Inclusion of these identifiers within the response generation output 54 allows the information presented in the generated response text 56 to be traced back to the specific page or pages of the original source documents 32. In a preferred embodiment, for each response candidate element 31R utilized to produce the generated response text 56, the response generation module 50 records the corresponding utilized content attribution identifiers 38UA. In addition, the generated response text 56 and the utilized content attribution identifiers 38UA are preferably distinct and separate within the response generation output 54, allowing the generated response text 56 to include only the natural language answer which will ultimately be presented to the user.

Turning to FIG. 9 while also referring to FIG. 2, FIG. 3, FIG. 4, FIG. 5, and FIG. 8, the knowledge attribution engine 12 carries out knowledge validation of the generated response text at step 334. In one embodiment, the query orchestration module 40 receives the response generation output 54 and retrieves the corresponding knowledge validation image 26V for each knowledge element 31 utilized by the response generation module 50 to produce the generated response text 56. This feature is facilitated by the presence of the utilized content attribution identifiers 38UA within the response generation output 54. Using the source attribution identifier 38A and the source position identifier 38B, the query orchestration module 40 may retrieve the appropriate knowledge validation image 26V from the image repository 26.

In one embodiment, the generated response text 56 may be presented to the user via a response presentation interface 19 at step 336, in conjunction with the knowledge validation image 26V associated with each knowledge element 31 incorporated into the generated answer. The response presentation interface 19 may be executed as a graphical user interface within the user device 14. Alternatively, response presentation interface 19 may be implemented as an API (application programming interface) endpoint for external retrieval of the generated response output 54. As such, the generated response text 56 and the knowledge validation images 26V may be retrieved and presented within an external application through the knowledge attribution engine API.

Figure 5:
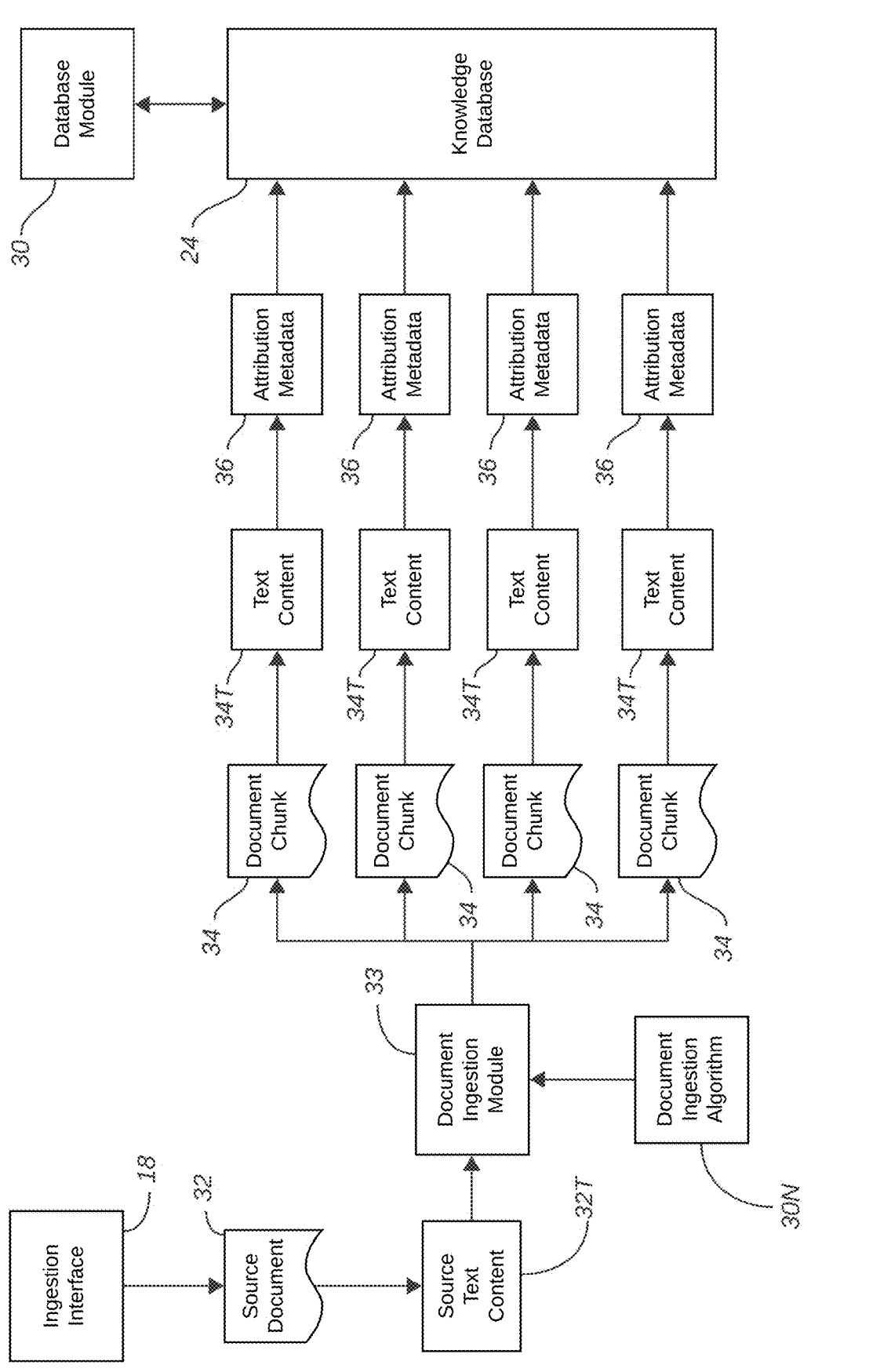
FIG. 5 is a block diagram depicting part of an example document ingestion process in which a source document is divided into document chunks for further processing, in accordance with an embodiment in the present disclosure.
Figure 6:
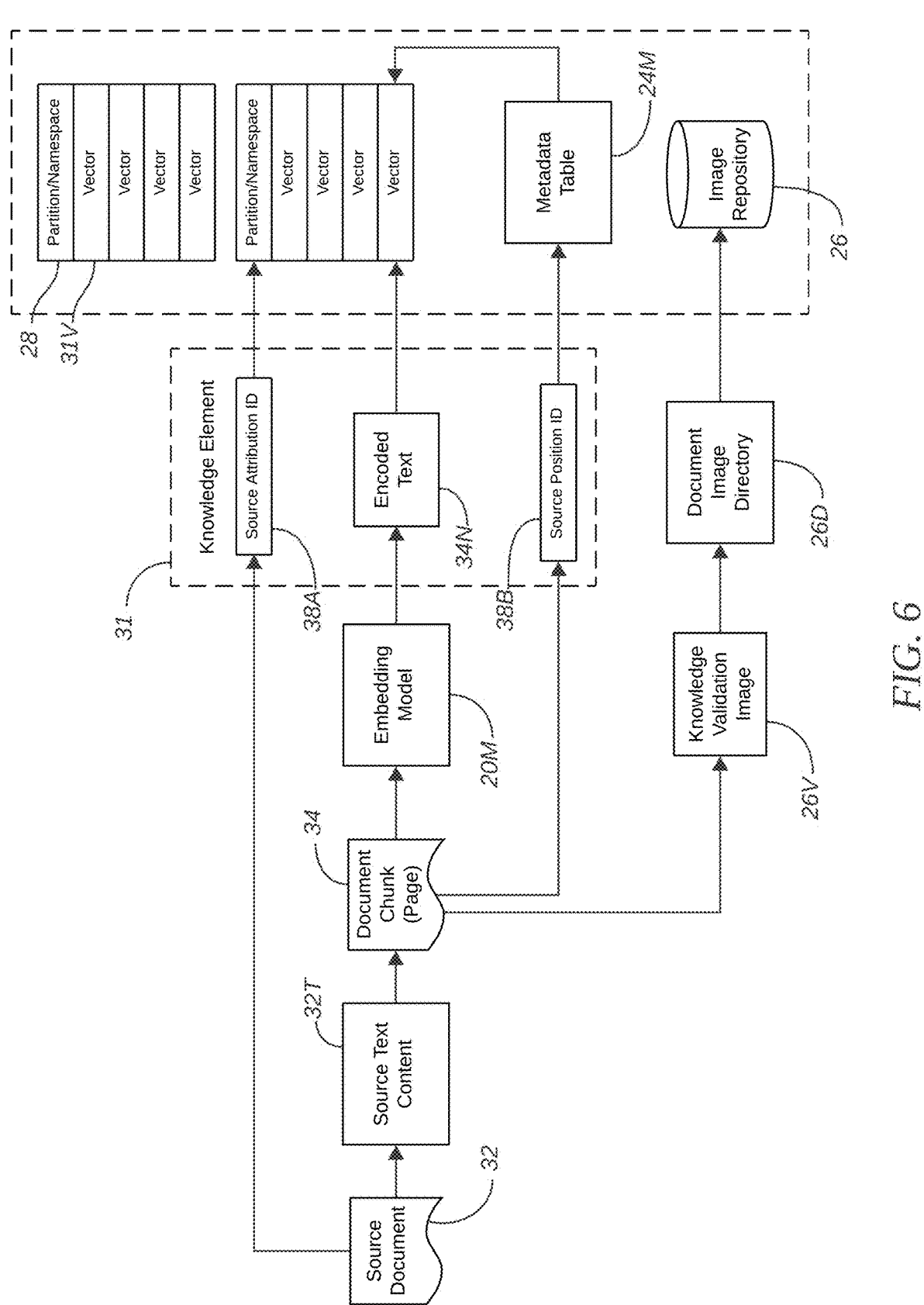
FIG. 6 is a block diagram depicting part of the document ingestion process in which extracted text content from the source document is processed and stored as knowledge elements within a segregated attribution database, in accordance with an embodiment in the present disclosure.
Figure 7:
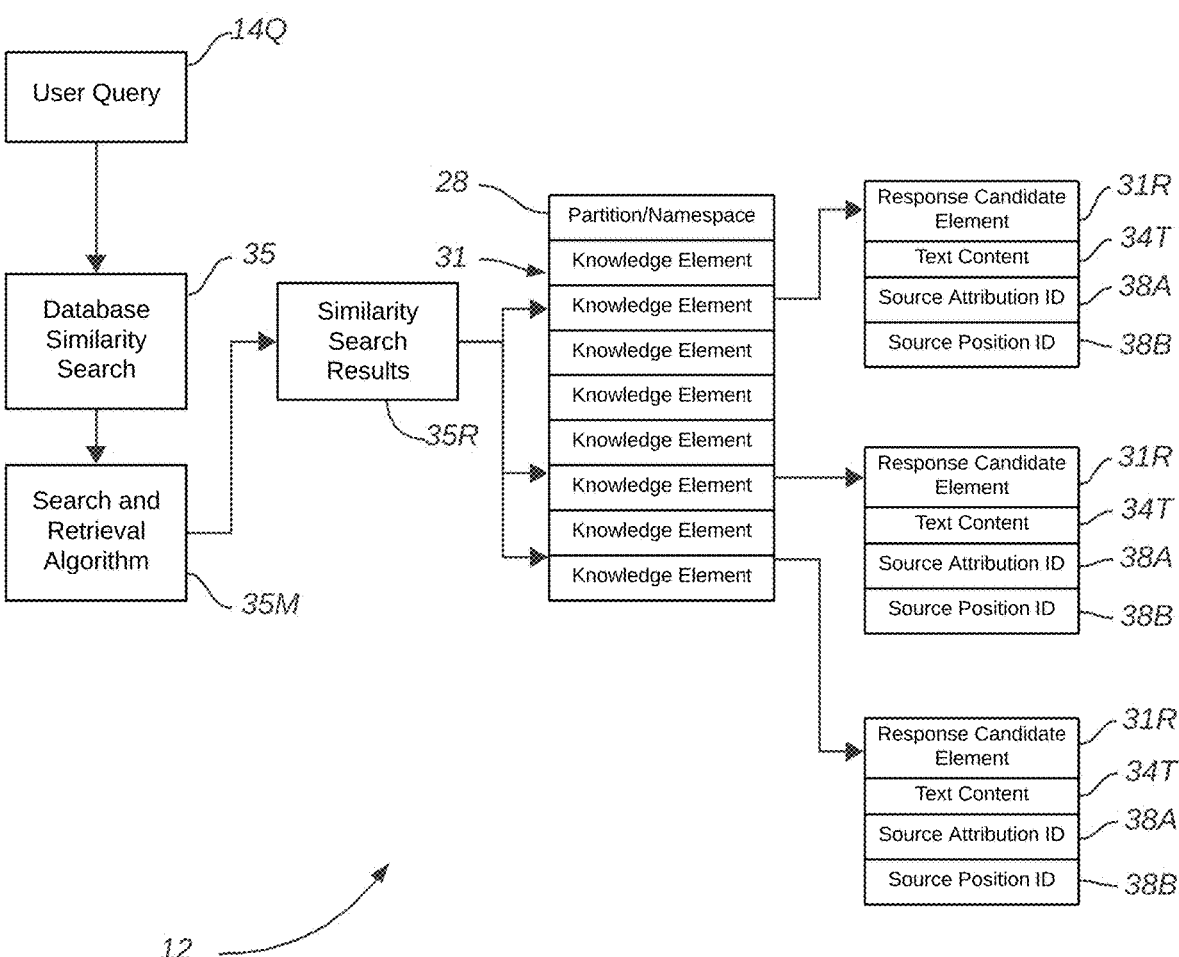
FIG. 7 is a block diagram depicting an example database similarity search process, in which the database module executes a search and retrieval algorithm to identify knowledge elements which are relevant to the user query, and returns the identified knowledge elements as response candidate elements, in accordance with an embodiment in the present disclosure.

In some embodiments, the knowledge validation image 26V can be replaced by a text-based knowledge validation citation. The utilized content attribution identifiers 38UA can be used to retrieve the text content associated with each originating document chunk 34 (as shown in FIG. 5) of the appropriate source document 32.

This validation enables users to consult the knowledge validation image or citation as visual or textual proof of the information contained within the generated response text 56.

The knowledge validation presents a direct reference from the original source document 32, allowing users to independently confirm the validity and accuracy of the generated answer by comparing it with the original content encapsulated in the originating portions of the source document 32. By examining the relevant knowledge validation images 26V, users can substantiate whether the information within the generated response text 56 corresponds accurately to the original source. In addition to the textual content within the pages of the source document 32, a knowledge validation image 26V may depict any diagrams, figures, charts, tables, illustrations, photographs, and other non-text contents which are present in the original page or pages. Furthermore, any user-added elements present within the source document 32 at the time of ingestion, such as signatures, notes, handwritten text, highlights, and other elements, may also be captured and shown in the knowledge validation image 26V of the original page or pages as appropriate. In alternate embodiments where a non-image knowledge validation citation is used, the citation may include a text excerpt of the originating page of the source document 32, or may include a link or reference which directs the user to view the actual source document 32 itself, at the appropriate page.

Additionally, in certain embodiments, this validation process can be automated utilizing a generative model configured to perform validation operations. The model may compare the generated response text 56 with both the user query 14Q and the content of the originating document chunks 34 through the knowledge validation image 26V or text-based citation. This automated comparison allows for the detection of inconsistencies or anomalies, thereby providing an integrated mechanism to ensure that the generated answer aligns appropriately with verifiable data.

Referring to FIG. 4, FIG. 5, FIG. 8, FIG. 9, FIG. 10 and FIG. 11, we now turn to an example response generation output 54 generated in response to an example user query 14Q. The present example illustrates a generated response text 56 that utilizes the contextual and semantic capabilities of the knowledge attribution engine 12 to synthesize a comprehensive answer to a user query 14Q. The generated response text 56 necessitates an explanation of prior operational steps that must be sequentially executed, as the specific function requested by the user occurs during the latter stages of this sequence. Furthermore, for purposes of the example, a key portion of the solution to the query at hand is found not within the text content but only within an illustration included in the original source document 32. Consistent with the response generation framework, the response generation output 54 incorporates utilized content attribution identifiers 38UA for all utilized elements 42U.

The example user query 14Q requests information on how to turn on a camera. The search results produced in response to the user query 14Q are drawn from the source document 32*corresponding* to the user manual for the specific camera model in question.

In the present example, the majority of the knowledge utilized to formulate the generated response text 56 is extracted from "Page 23" of the source document 32. To provide a full response that addresses the user query 14Q, "additional information" from "Page 75" and "Page 85" is incorporated. In the present example, this supplemental information is not present on "Page 23." For example, while "Page 23" contains an instruction to insert the battery into the camera, the text of this page does not specifically state that the battery must be charged in order for the camera to function. As such, the generated response text 56 includes knowledge which directs the user to ensure that the battery is charged, and further includes troubleshooting information pertaining to potential problems related to the battery. As a result, knowledge validation images 26V for all three originating pages—"Page 23," "Page 75," and "Page 85"—are appended to permit validation and source attribution of the information within the generated answer. Furthermore, in the present example, one of the final procedures for turning on the camera involves rotating a physical switch on the camera itself. For illustrative purposes, the original text of "Page 23" of the source document 32 does not inform the reader of the location of the switch or its mode of operation. Instead, an illustration present on "Page 23" of the source document 32 identifies the switch, and depicts a visual instruction to rotate the switch in a clockwise direction.

In the present example, the source position identifiers 38B present in the response generation output 54 directly reference pre-generated knowledge validation images 26V stored within the image repository 26, thereby allowing efficient, immediate retrieval. The knowledge attribution engine 12 may therefore retrieve the reference knowledge validation images 26V for display via the response presentation interface 19.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, Python, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generative artificial intelligence (AI) refers to the class of algorithms that leverage machine learning techniques to generate new content based on input data. It is widely implemented in modern computing to perform tasks such as content creation, data augmentation, and problem-solving. Generative AI models are designed to understand and produce human-like text through processes that involve the generation of outputs probabilistically, respecting the patterns learned from extensive datasets during training.

In light of the objectives of the present disclosure, several generative AI platforms can be employed to facilitate the AI-driven functionalities. Notable examples of these platforms include the GPT family, BERT, and RoBERTa. These platforms are renowned for their capabilities in understanding and responding to natural language inputs, thereby enhancing interaction with end-users and enabling robust query resolution within the knowledge attribution framework.

Generative AI models can be deployed either locally on user devices or remotely via cloud services connected through the internet. Local deployment allows for immediate integration with device-specific context and data while ensuring adherence to data privacy requirements. On the other hand, remote deployment leverages substantial computational resources available through cloud platforms, facilitating complex processing tasks that may exceed the capacity of personal devices. This dual deployment flexibility enhances the adaptability of generative AI models in various computing environments, thereby broadening the scope and effectiveness of their applications.

Generative artificial intelligence models encompass a variety of architectures, each designed to produce probabilistic outputs based on input data or constraints. Key among these are large language models (LLMs) and small language models (SLMs), which primarily focus on interpreting natural language inputs to generate coherent textual responses. LLMs leverage extensive datasets and significant computational resources to capture intricate patterns in language, facilitating advanced tasks such as language translation, content creation, and complex query resolution. SLMs, while similar in function, operate on more limited datasets or under constraint conditions, offering a streamlined approach that may be more suitable for specific applications where resource efficiency is paramount.

These models interpret prompts or instructions through a series of tokenization, embedding, and attention mechanisms designed to parse the input contextually. The process begins with the decomposition of the prompt into tokens, which are then mapped into high-dimensional vector spaces, allowing the model to establish semantic relationships. The attention mechanism prioritizes parts of the input that are most relevant for the task at hand, thereby enabling the model to construct a meaningful output sequence. This output generation proceeds within a framework trained to maximize the probability of producing contextually accurate and coherent responses.

Generative AI models can employ a Retrieval-Augmented Generation (RAG) process to enhance their capability to handle user queries by integrating external knowledge sources with inherent training data. In this approach, the model first retrieves relevant information from a designated knowledge base, which is then integrated into the generation process to craft responses that align with the retrieved data. Such integration allows the model to generate answers that reflect both the supplied information and its internal understanding of language, resulting in outputs that are both factual and context-aware.

Prompt engineering plays a critical role in controlling the output of generative AI models. Through this methodology, specific instructions or commands are embedded within the prompt to direct the model's response generation. By carefully crafting these prompts, it is possible to tailor the model's output to adhere strictly to desired formats, styles, or information domains. This allows models to produce tailored outputs that strictly respect constraints, offering enhanced predictability for a wide range of applications, including instructional or operational scenarios where precise adherence to input directives is required.

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented a knowledge attribution platform. The disclosure is illustrated by example in the drawing figures, and throughout the written description. It should be understood that numerous variations are possible, while adhering to the inventive concept. Such variations are contemplated as being a part of the present disclosure.

What is claimed is:

1. A knowledge attribution system for providing proof-of-answer for generative artificial intelligence output, comprising:

a control server having a computer storage device, operably connected to a user device;

a knowledge base stored using the computer storage device, the knowledge base comprising one or more source documents, each source document having one or more document segments;

a knowledge database stored using the computer storage device, the knowledge database comprising a plurality of knowledge elements, each knowledge element representing one of the document segments of each source document, each knowledge element having attribution metadata associating the knowledge element with the originating document segment, the attribution metadata further comprises a source attribution identifier and a source position identifier, the source attribution identifier references the source document from which the knowledge element is derived, and the source position identifier references the corresponding document segment of the knowledge element, the knowledge database is configured as a segregated database comprising a plurality of partitions, with each of the partitions containing the knowledge elements of one of the source documents, and each document segment of each source document has text content, the text content of each document segment is represented in the corresponding knowledge element as an encoded text portion, the encoded text portion corresponding to a vector representation which captures semantic and contextual meaning present within the text content in order to facilitate the similarity search which identifies the response candidate elements; and a knowledge attribution engine executed by the control server, the knowledge attribution engine having a response generation module, the knowledge attribution engine is adapted to receive a user query entered via the user device, conduct a similarity search of the knowledge database directed at the knowledge elements of one of the source documents via the corresponding partition, and retrieve one or more response candidate elements as search results, each response candidate element corresponding to one of the knowledge elements which are relevant to the user query, the knowledge attribution engine is further adapted to generate an augmented query which instructs the response generation module to produce a response generation output utilizing at least one of the response candidate elements, wherein the augmented query includes the text content of each response candidate element, and further includes a generative restriction command instructing the response generation module to produce the generated response text only using the text content of the response candidate elements, the response generation output comprising a generated response text which answers the user query, and the response generation output further includes the attribution metadata of each response candidate element which is utilized to produce the generated response text, the knowledge attribution engine is further adapted to generate and display a a proof of answer image of each of the utilized response candidate elements using the attribution metadata within the response generation output, to serve as proof-of-answer for the generated response text, wherein the proof of answer image comprises a screenshot of each of the document segments of the source document which are identified by the attribution metadata of the response text, and wherein the generated response text and the knowledge validation image are displayed via the user device.

2. The knowledge attribution system of claim 1, wherein: the knowledge attribution engine further comprises a document ingestion module, the document ingestion module is adapted to populate the knowledge database by processing each of the source documents within the knowledge base and dividing the source document into its constituent document segments, wherein each of the knowledge elements is derived from one of the document segments of each of the source documents.

3. The knowledge attribution system of claim 1, wherein: each document segment represents one or more pages of the source document; and the proof of answer image of each document segment visually reproduces non-textual content present within the document segment in addition to the text content thereof.

4. The knowledge attribution system of claim 1, further comprising a response presentation interface, the response presentation interface is implemented upon the user device, the response presentation interface is adapted to display the generated response text and the corresponding proof of answer image for each of the utilized response candidate elements.

5. The knowledge attribution system of claim 1, further comprising a knowledge attribution engine application programming interface endpoint, wherein the generated response text and the corresponding proof of answer image for each of the utilized response candidate elements are made available for external retrieval by the knowledge attribution engine via the knowledge attribution engine application programming interface endpoint.

6. The knowledge attribution system of claim 1, wherein the user query further identifies the source document towards which the similarity search is directed.

7. The knowledge attribution system of claim 6, wherein the user query is submitted to the knowledge attribution system via a knowledge attribution engine application programming interface.

8. A method for providing proof-of-answer for generative artificial intelligence output, comprising the steps of:

providing a knowledge base comprising one or more source documents, each comprising one or more document segments containing text content;

ingesting each of the source documents to create a knowledge element for each document segment of the source document, representing the text content of each document segment as an encoded text portion within the corresponding knowledge element, using a vector representation to capture semantic and contextual meaning for the similarity search, and creating attribution metadata which associates the knowledge element with the originating document segment, the attribution metadata of each knowledge element comprising a source attribution identifier and a source position identifier, the source attribution identifier referencing the source document from which the knowledge element is derived, and the source position identifier referencing the corresponding document segment of the knowledge element;

populating a knowledge database by storing the knowledge elements within the knowledge database;

configuring the knowledge database as a segregated database with a plurality of partitions, each partition containing the knowledge elements of one of the source documents;

receiving a user query by a knowledge attribution engine;

conducting a similarity search of the knowledge database directed at the partition containing the knowledge elements of one of the source documents to retrieve response candidate elements, each response candidate element corresponding to one of the knowledge elements which is relevant to the user query;

generating an augmented query that includes the text content of each response candidate element, and instructs a response generation module to use at least one of the response candidate elements to produce a response generation output, the augmented query further instructing the response generation module to produce a generated response text using only the text content of the response candidate elements;

producing the response generation output, the response generation output comprising an answer to the user query in the form of the generated response text, the response generation output further comprising the attribution metadata of each response candidate element utilized to produce the generated response text;

generating a proof of answer image for each utilized response candidate element using the attribution metadata, the proof of answer image comprising a screenshot of each of the document segments of the source document which are identified by the attribution metadata of the response text, and presenting each proof of answer image as proof-of-answer for the generated response text which visually represents the corresponding source document.

9. The method as recited in claim 8, wherein:

each document segment represents one or more pages of the source document; and the step generating a proof of answer image further comprises the proof of answer image visually reproducing non-textual content present within the document segment in addition to the text content.

10. The method as recited in claim 8, further comprising:

implementing a response presentation interface on a user device; and adapting the response presentation interface to display the generated response text in conjunction with the proof of knowledge image for each utilized response candidate element.

11. The method as recited in claim 8, further comprising:

making the generated response text and the corresponding proof of answer images available for external retrieval via a knowledge attribution engine application programming interface endpoint.

12. The method as recited in claim 11, wherein the user query is submitted to the knowledge attribution engine via the application programming interface endpoint.

13. The method as recited in claim 8, wherein the user query further identifies the source document towards which the similarity search is directed.

* * * * *